(12) United States Patent
Szapiro et al.

(10) Patent No.: US 9,104,542 B2
(45) Date of Patent: *Aug. 11, 2015

(54) APPARATUS AND METHOD FOR FAST TAG HIT WITH DOUBLE ERROR CORRECTION AND TRIPLE ERROR DETECTION

(71) Applicant: Intel Corporation, Santa Clara, CA (US)

(72) Inventors: Ariel Szapiro, Tel Aviv (IL); Alexander Gendler, Kiriat motzkin (IL)

(73) Assignee: Intel Corporation, Santa Clara, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 13/730,750

(22) Filed: Dec. 28, 2012

(65) Prior Publication Data

US 2014/0189473 A1 Jul. 3, 2014

(51) Int. Cl.
*G06F 11/10* (2006.01)
*G06F 11/00* (2006.01)

(52) U.S. Cl.
CPC .......... *G06F 11/006* (2013.01); *G06F 11/1064* (2013.01)

(58) Field of Classification Search
CPC .............. G06F 11/1064; G06F 11/006; G06F 12/0895; H03M 13/13; H03M 13/3776; H03M 13/19
USPC .............. 235/462.1; 713/161; 714/52, 53, 54, 714/768, 763, 807
See application file for complete search history.

(56) References Cited

U.S. PATENT DOCUMENTS

| | | | | |
|---|---|---|---|---|
| 5,509,119 | A * | 4/1996 | La Fetra | 714/52 |
| 6,226,763 | B1 * | 5/2001 | Fu et al. | 714/53 |
| 8,297,510 | B1 * | 10/2012 | Yakshtes et al. | 235/462.1 |
| 2004/0123102 | A1 * | 6/2004 | Gehrmann et al. | 713/161 |
| 2005/0289295 | A1 * | 12/2005 | Shoham et al. | 711/108 |
| 2010/0185904 | A1 * | 7/2010 | Chen | 714/54 |
| 2011/0161783 | A1 * | 6/2011 | Somasekhar et al. | 714/768 |
| 2012/0246543 | A1 | 9/2012 | Szapiro et al. | |

* cited by examiner

*Primary Examiner* — David Ton
(74) *Attorney, Agent, or Firm* — Nicholson De Vos; Webster & Elliott, LLP (57) ABSTRACT

A method is described that includes reading a cache tag and the cache tag's corresponding ECC from storage circuitry of a cache. The method also includes generating an ECC for a search tag. The method also includes calculating a hamming distance between a) the cache tag and its corresponding ECC and b) the search tag and its corresponding ECC. The method also includes determining if the cache tag matches the search tag by determining if said hamming distance is two or less.

20 Claims, 6 Drawing Sheets

APPARATUS AND METHOD FOR FAST TAG HIT WITH DOUBLE ERROR CORRECTION AND TRIPLE ERROR DETECTION

FIELD OF INVENTION

The field of invention is related to information processing generally, and, more specifically, to an apparatus and method for a fast tag hit.

BACKGROUND

A computing system is typically designed to store software instructions and data within the computing system's system memory. Typically there is a noticeable latency or delay associated with the storing of data into system memory and the fetching of instructions and data from the system memory. As such, in an attempt to avoid these delays/latencies where possible, many computing systems also include a cache.

A cache is a storage resource that, from the perspective of the central processing unit (CPU), has a noticeably smaller associated latency than system memory (e.g., by being located closer to the CPU than the system memory and/or being constructed with faster storage cells). Generally, the computing system attempts to store frequently used data and instructions into the cache. By storing frequently used data and instructions in the cache the average latency associated with the storage of data and/or the fetching of data and instructions is noticeably less than the latency of system memory. This reduction in average latency translates into an improvement in the performance of the computing system.

Items of data or instructions are typically stored in the cache along with their associated system memory address. If a CPU needs a particular data item or instruction item the CPU identifies it through its system memory address. The cache is then searched for the data/instruction item by searching through the addresses of the items stored within the cache. If the address of a stored item matches the address of the requested item, the cache is understood to contain the desired item ("a hit"). The item is then delivered to the CPU from the cache thereby avoiding the additional delay associated with accesses made to the system memory.

Many cache architectures are organized to partition their storage resources according to the addresses of the data/instruction items that may be stored (and searched for) in the cache. In a particular approach, the storage resources of the cache are divided into sets where each set has a plurality of storage locations referred to as ways. According to one cache search approach, a particular address that is presented to the cache for searching (a "search address") is viewed as having both a set component and a tag component. For the given search address, an appropriate set is identified based on the search address's set component. The tag component of the search address is them compared against the respective tag components of the addresses of the cached items within the ways of the set. A match corresponds to a cache hit.

Figure 1:
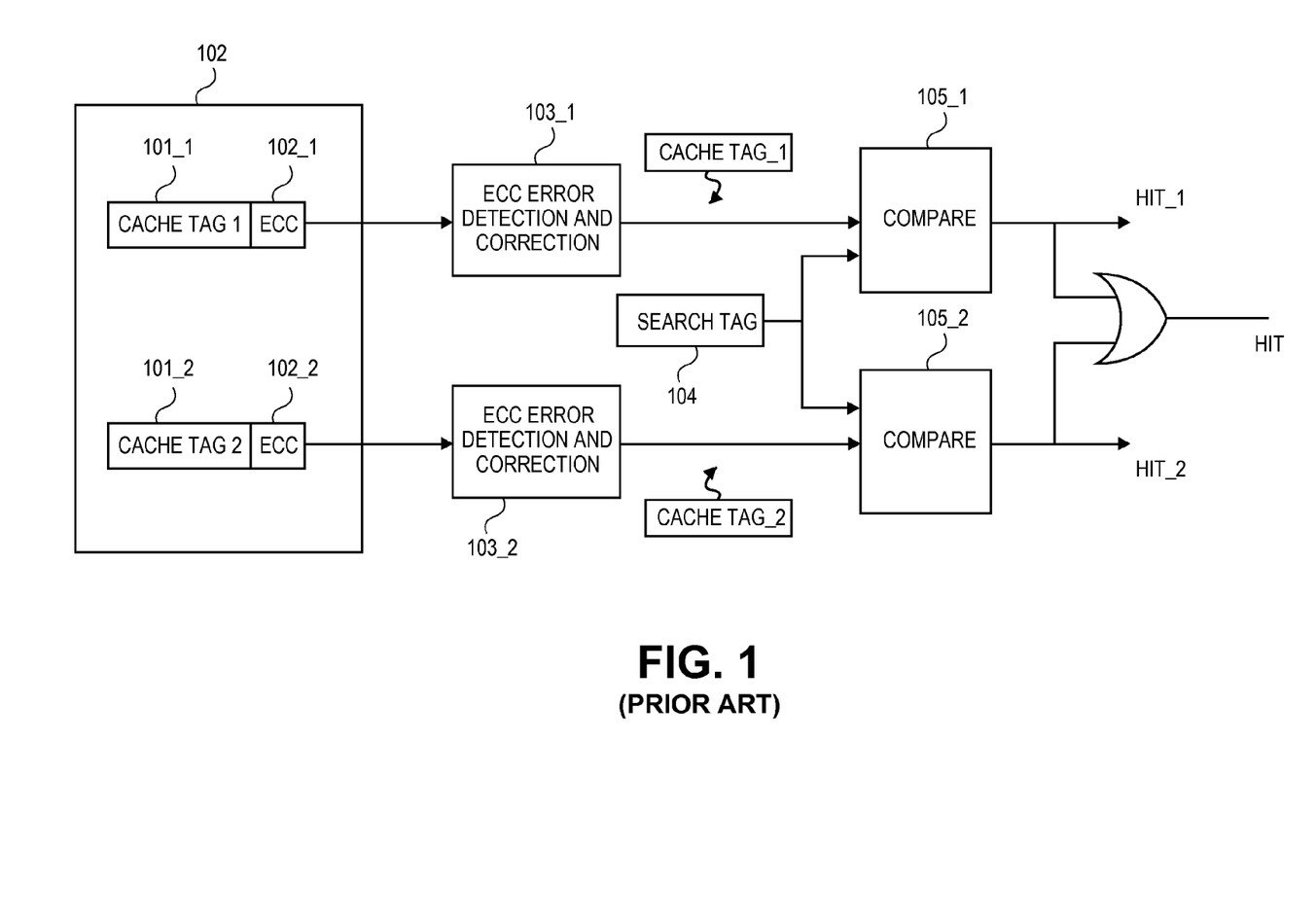
FIG. 1 shows a prior are cache search circuit.

FIG. 1 shows a typical circuit for performing such a cache search. The respective tag components 101_1, 101_2 of items cached in the respective ways of the set 102 are stored along with their own associated error correction codes (ECC) 102_1, 102_2. According to the operation of the circuit of FIG. 1, the tags of two cached items and their associated ECC codes are read from the cache substantially simultaneously. ECC checking and correction circuitry 103_1, 103_2 generates a second ECC for each tag, and, if the newly generated ECC is different than the stored ECC for the respective tag an error in the tag value is flagged and corrected.

The correct tags are then compared against the tag component 104 of the search address by respective comparison circuits 105_1, 105_2. A match found by either of the comparison circuits corresponds to a cache hit.

FIGURES

The present invention is illustrated by way of example and not limitation in the figures of the accompanying drawings.

DETAILED DESCRIPTION

Figure 2:
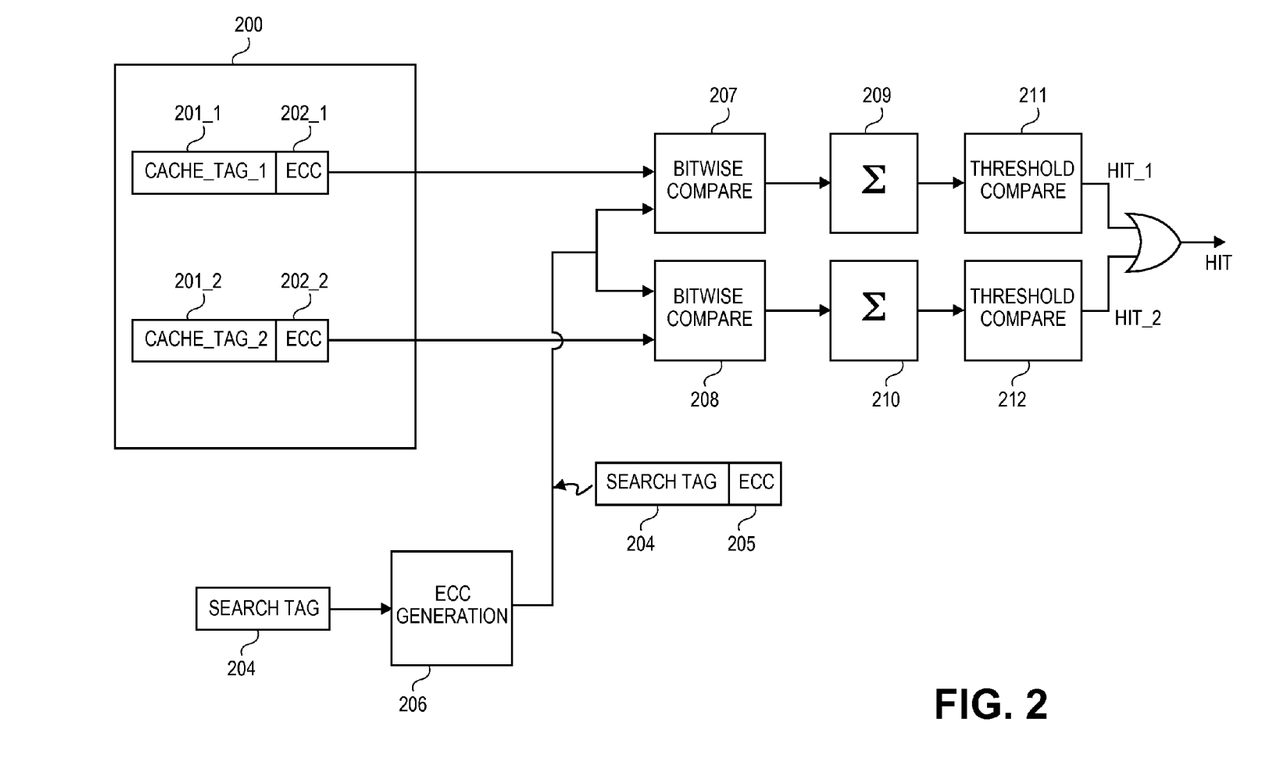
FIG. 2 shows an improved cache search circuit.

FIG. 2 shows an improved architecture that performs a cache search without checking for corruption of the cached tags prior to their comparison with the search tag. By avoiding the error checking and correction procedure between the read of the cached tag and its comparison with the search tag, the performance of the cache search process is improved. Noticeably, although the error checking and correction is not performed before the comparison, the ECC information is nevertheless utilized.

Specifically, rather than use a cached tag's ECC to identify and correct errors in the cached tags, the Hamming distance is determined between a first data structure comprised of a cached tag and its ECC and a second data structure comprised of the search tag and its ECC. A decision as to whether or not a cache hit exists is based on a comparison of the hamming distance against a threshold. A Hamming distance is essentially the number of different bits observed between a pair of equal sized data structures. For instance, the Hamming distance between words 0011001 and 1010100 is 4.

A minimal Hamming distance is a function of the error detection/correction code. In particular, viewing a tag+ECC data structure as a codeword, the minimal Hamming distance is the smallest difference in the number of bits between any two different and valid tag+ECC codewords (here, on account of the ECC component, even if the tag component is permitted to be random, it is understood that there are valid tag+ECC codewords and invalid tag+ECC codewords). For instance, if a particular error detection/correction code is characterized as having a minimal hamming distance of 6, then, any two different and valid tag+ECC data structures will have at least 6 different bits between them when the two data structures are compared.

A property of such error detection/correction codes is that, if the minimal Hamming distance is defined to be $d_m$, then, the code can be used to detect up to $\text{ceiling}((d_m-1)/2)$ errors in any particular codeword and correct up to $\text{floor}((d_m-1)/2)$ errors in any particular codeword. For example, a code having a minimal Hamming distance=$d_m$=6 can detect up to 3 errors in any codeword and correct up to 2 errors in any codeword.

A theory of operation of a cache hit circuit is as follows: if the Hamming distance between a cached tag+ECC data structure and a search tag+ECC data structure is calculated to be less than or equal to $\text{floor}((d_m-1)/2)$, then, the two data structures can be deemed to match. Said another way, if a comparison between two codewords yields a result that is less than or equal to the ability of the code to correct an error within any particular codeword, then, the two code words can be presumed to be the same. Determining a cache hit based on this perspective avoids the need for error detection and correction of the tag values that are read from cache and therefore improves performance as compared to the circuit of FIG. 1.

According to the operation of the circuit of FIG. 2, a pair of cached tag values 201_1, 201_2 and their respective ECC values 202_1, 202_2 are read from the cache substantially simultaneously. An ECC 205 value is also generated for the search tag 204 by ECC generation circuitry 206. In an embodiment, the ECC 205 for the search tag 204 is generated by the ECC generation circuitry 206 substantially in parallel (or at least with some overlap in time) with the reading of the cached tags and their respective ECCs from the cache 200. The data structure comprised of the search tag 204 and its ECC 205 is then compared by bitwise comparison circuits 207, 208 against both of the data structures comprised respectively of one of the cached tags 201_1/201_2 and its respective ECC 202_1/202_2. In various embodiments the comparison circuits are implemented with some form of XOR gate to perform the bitwise comparison of the pair of input data structures.

Summation circuits 209, 210 then effectively add the number of bits that are different in each respective comparison. Recalling that a Hamming distance corresponds to the number of different bits between two codewords, the output of summation circuits 209, 210 corresponds to the respective Hamming distance between the search tag 204 and its ECC value 205 and one of the cached tags 201_1/201_2 and its ECC value 202_1/202_2. Recalling that an underlying philosophy of the search is that a match can be presumed if the Hamming distance between these comparisons is less than or equal to floor$((d_m-1)/2)$. As such, threshold comparison circuits 211, 212 receive the respective summation values from summation circuits 209, 210 to determine if the respective summations reach the necessary threshold. For instance, in the case of $d_m=6$, threshold comparison circuits 211, 212 determine if a summation is less than or equal to 2. If the appropriate threshold is reached, a summation circuit will raise a match flag at its output.

Although FIG. 2 shows processing for a pair of cache tags and their respective ECCs, the architecture of FIG. 2 can be readily extended to process more than two cache tags and their ECCs at a time for a single search tag, or, may be reduced to only process a single cache tag and its ECC at a time. Moreover, although the circuit of FIG. 2 is understood to be instantiated for a single set within a cache, such a circuit could be instantiated multiple times (e.g., one such circuit for each set of a cache).

Figure 3:
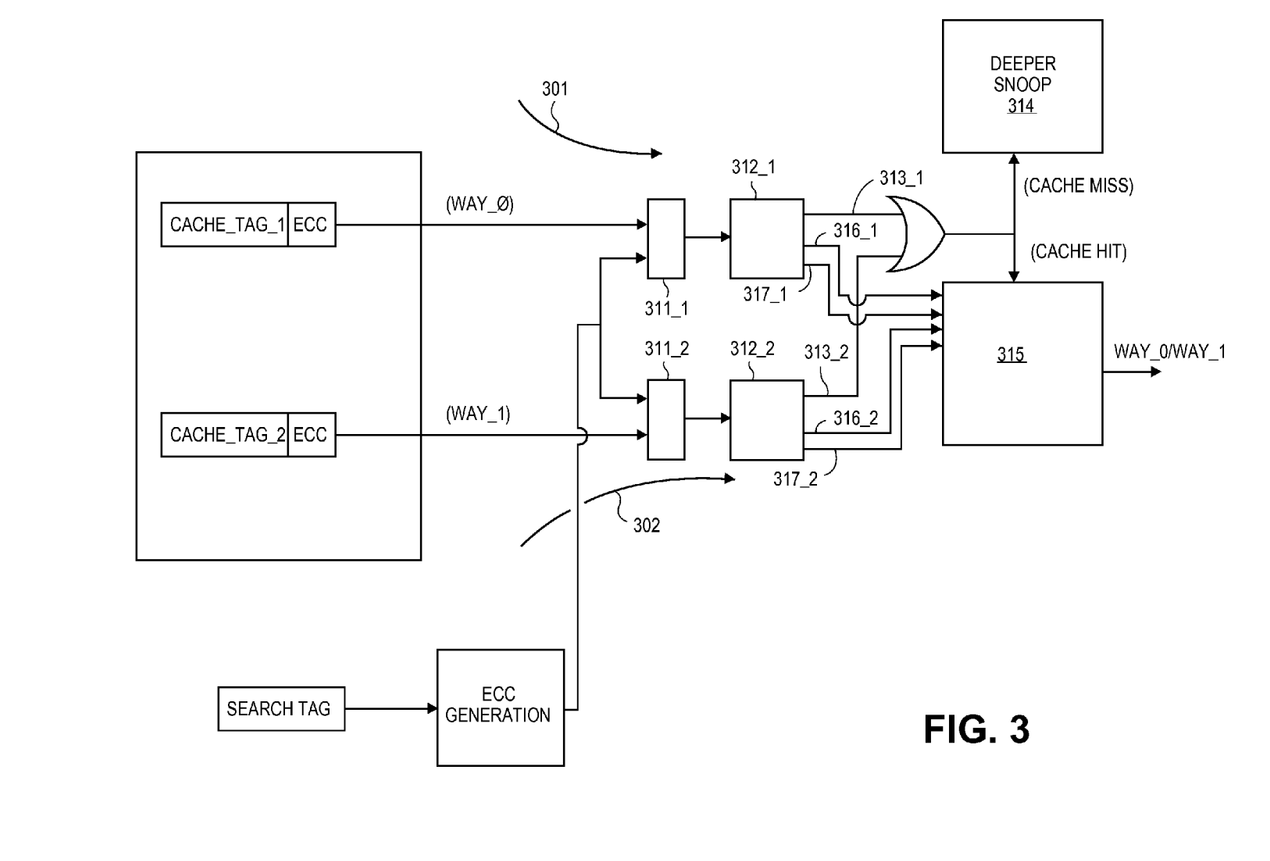
FIG. 3 shows an embodiment of a summation circuit and threshold comparison circuit.

FIG. 3 shows a more detailed embodiment of a summation and threshold compare channel. As observed in FIG. 3, a bitwise XOR comparison block 311_1, 311_2 is used to perform the bitwise comparison between two different cache tag+ECC terms and the search tag+ECC term where the corresponding ECC code has $d_m=6$. As is known in the art, the tag essentially corresponds to a particular sought for address within the cache's set. Said another way, for any set, a cached item may be in any of a number of ways. Here, the two channels 301, 302 of FIG. 3 correspond to two different ways of a cache. If the "looked for" tag is found in one of the channels, it will identify which way the cached information is cached in. By executing the two channels in parallel, two different ways can be simultaneously scanned for the cached information. That is, if a match is found in channel 301, then, the cached information is in Way_0, or, if the match is found in channel 302, then, the cached information is in Way_1.

As described above, along any particular one of the channels, in the case where $d_m=6$, a "match" will be declared so long as the bitwise difference between its two input terms (the search tag+ECC and the cache tag+ECC for the channel's particular way) is 2 or less. As such, adder and threshold circuitry 312_1 adds the resultant of the bitwise comparison for channel 301 and provides a signal 313_1 indicating whether or not the bitwise difference is 2 or less for that channel 301. Likewise, adder and threshold circuitry 312_2 adds the resultant of the bitwise comparison for channel 302 and provides a signal 313_2 indicating whether or not the bitwise difference is 2 or less for that channel 302. Here, adder and threshold circuitry 312_1 essentially corresponds to logic blocks 209 and 211 of FIG. 2 combined, and, adder and threshold circuitry 312_2 essentially corresponds to logic blocks 210 and 212 of FIG. 2 combined.

If either signal 313_1, 313_2 is not activated it corresponds to no "hit" in the cache for the two ways associated with the two cache tags. For the sake of simplicity, assume that there are only two ways per set. In this case both signals 313_1, 313_2 indicating no "hit" corresponds to a cache miss (those of ordinary skill will be able to readily add additional parallel channels to the approach of FIG. 3 for sets having more than two ways). The indication of a cache miss, in turn, is used by logic circuitry 314, which is responsible for orchestrating snoops into deeper storage (e.g., a deeper caching level or system memory), to craft a snoop for the sought for information into next level storage. Notably, the process of FIGS. 2 and 3 is believed to be faster than the traditional approach of FIG. 1 which will perform error correction after the tag compare before a decision is made on whether there is a tag match. Performing the error correction before making a decision on a tag match consumes additional time deciding whether or not a cache hit exists. In the approach of FIGS. 2 and 3, therefore, circuitry 314 is able to begin the process of snooping into a deeper level storage before comparable circuitry can in a traditional implementation.

If either of signals 313_1, 313_2 is activated it corresponds to a "hit" in the cache. Logic circuitry 315, which is responsible for providing the cache line from cache, responds to the indication of a cache hit to begin the process of provided the cache line to the requesting agent. Here, two additional outputs 316_1, 316_2, 317_1, 317_2 from the adder and threshold circuitry 312_1, 312_2 of each channel are utilized by circuitry 315 in order to further process the just performed tag comparisons if necessary. Inputs 316_1, 316_2 indicates whether there are 1 or 2 errors in the bitwise comparison performed by XOR comparison block 311_1, 311_2 for their respective channels. Input 317_1, 317_2 indicates whether there are three errors in the bitwise comparison performed by XOR comparison block 311_1, 311_2 for their respective channels.

Recalling that an ECC code with hamming distance of 6 can be corrected in the case of 2 errors, it is possible that there will be an indication of a match along both channels 301, 302. In this case, logic 315 will need to resolve this resolve to determine which way/channel actually has the true match. Here, logic circuitry 315 includes error code correction circuitry or other circuitry to determine which way has the true match when at least one of channels 301, 302 indicates two or less errors. If both channels indicate three errors an error flag is raised.

Figure 4:
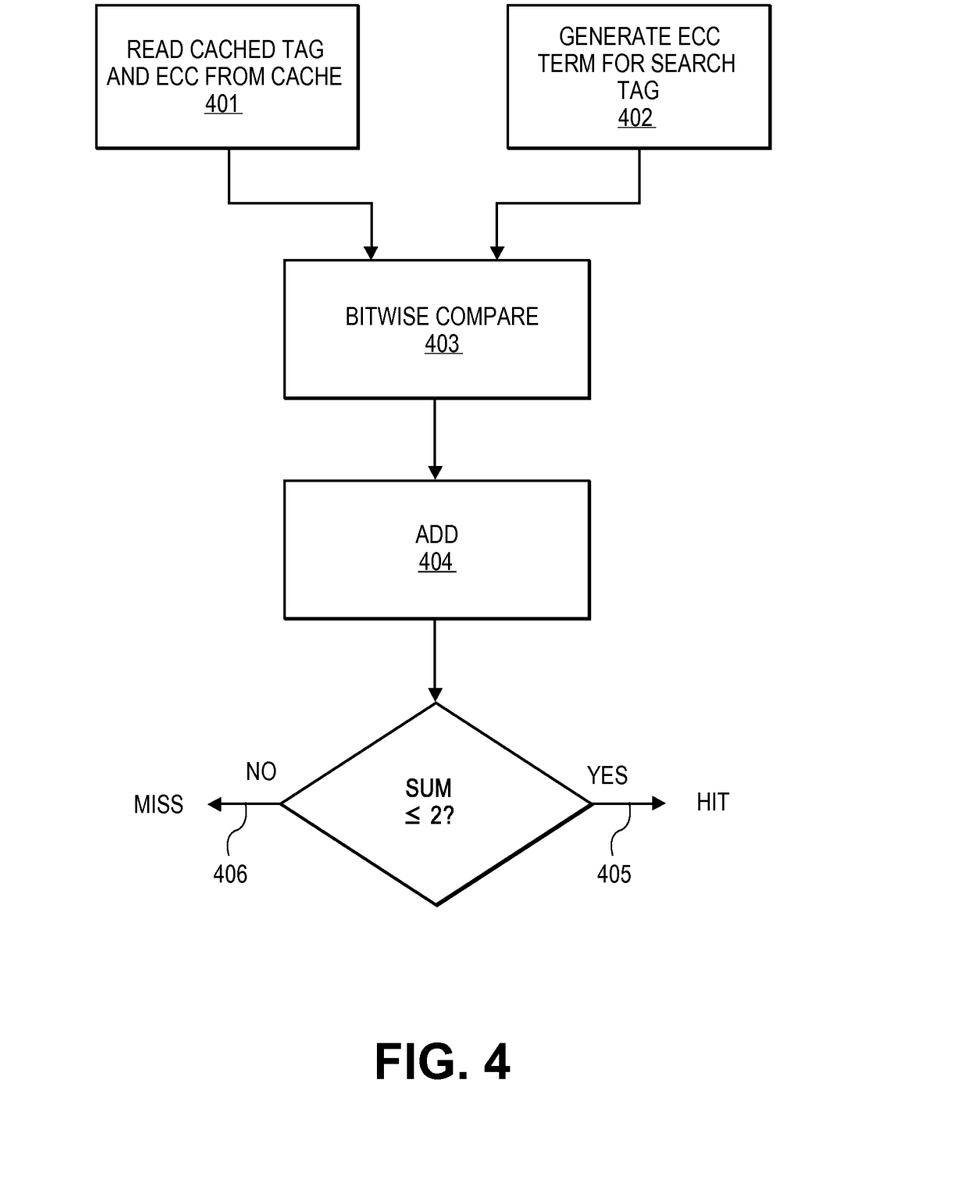
FIG. 4 shows a methodology for detecting a tag match.

FIG. 4 shows a methodology that various circuit structures discussed above can operate according to. Referring to FIG. 4, a cached tag and its respective ECC is read from a cache 401 while an ECC term is generated for a search tag 402. The search tag and its ECC is bitwise compared against the cache tag and its respective ECC 403. Resultant bits of the bitwise comparison are added 404. If the result of the addition 404 is less than or equal to 2 then a match is declared 405, else no match is declared 406. Notably, the above process can be executed in parallel for more than one cache tag and respective ECC(s) for a single search tag.

Figure 5:
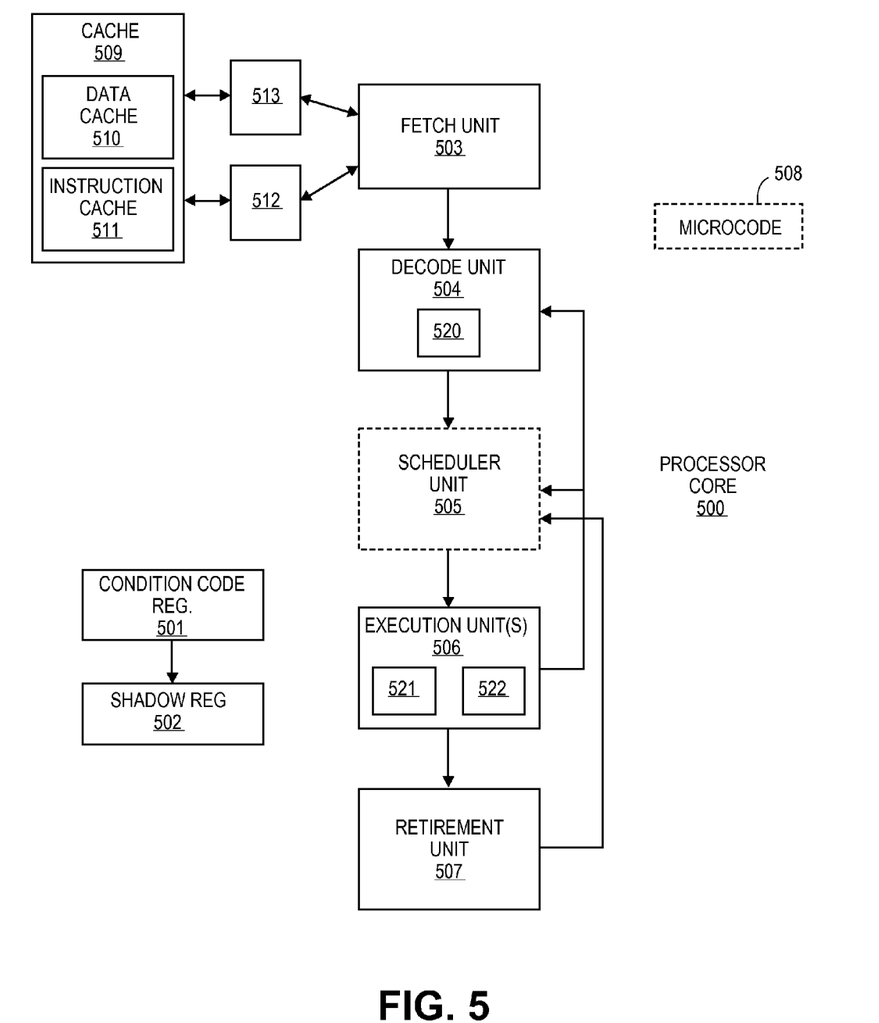
FIG. 5 shows a processor having improved tag match detection circuitry.

FIG. 5 shows a generic processing core 500 that is believed to describe many different types of processing core architectures such as Complex Instruction Set (CISC), Reduced Instruction Set (RISC) and Very Long Instruction Word (VLIW). The generic processing core 500 of FIG. 5 includes: 1) a fetch unit 503 that fetches instructions and/or data (e.g., from a cache 509 or memory); 2) a decode unit 504 that decodes instructions; 3) a schedule unit 505 that determines the timing and/or order of instruction issuance to the execution units 506 (notably the scheduler is optional); 4) execution units 506 that execute the instructions; 5) a retirement unit 507 that signifies successful completion of an instruction. Notably, the processing core may or may not include microcode 508, partially or wholly, to control the micro operations of the execution units 506.

The cache is observed to include both a data cache 510 and an instruction cache 511. Associated with each cache 510, 511 is an instruction cache search circuit 512 and a data cache search circuit 513. Notably, either or both of the cache search circuits 512, 513 may be designed to include any of the cache search techniques and/or circuits described above with respect to FIGS. 2 through 4. These circuits 512, 513, like the processing core 500 may be implemented with electronic circuitry such as logic circuitry implemented on a semiconductor chip.

Figure 6:
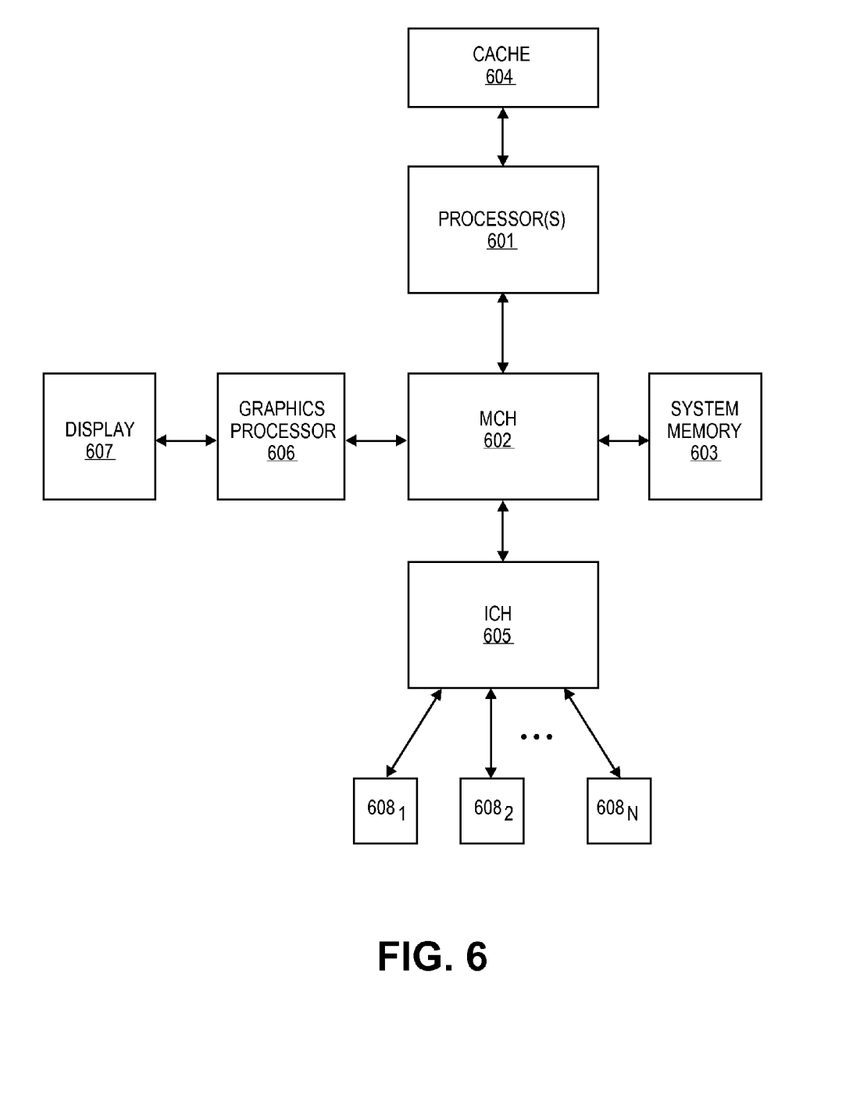
FIG. 6 shows a computing system.

A processing core having the functionality described above can be implemented into various computing systems as well. FIG. 6 shows an embodiment of a computing system (e.g., a computer). The exemplary computing system of FIG. 6 includes: 1) one or more processing cores 601 that may be designed to include two and three register scalar integer and vector instruction execution; 2) a memory control hub (MCH) 602; 3) a system memory 603 (of which different types exist such as DDR RAM, EDO RAM, etc.); 4) a cache 604; 5) an I/O control hub (ICH) 605; 6) a graphics processor 606; 7) a display/screen 607 (of which different types exist such as Cathode Ray Tube (CRT), flat panel, Thin Film Transistor (TFT), Liquid Crystal Display (LCD), DPL, etc.) one or more I/O devices 608.

The one or more processing cores 601 execute instructions in order to perform whatever software routines the computing system implements. The instructions frequently involve some sort of operation performed upon data. Both data and instructions are stored in system memory 603 and cache 604. Cache 604 is typically designed to have shorter latency times than system memory 603. For example, cache 604 might be integrated onto the same silicon chip(s) as the processor(s) and/or constructed with faster SRAM cells whilst system memory 603 might be constructed with slower DRAM cells. By tending to store more frequently used instructions and data in the cache 804 as opposed to the system memory 803, the overall performance efficiency of the computing system improves.

System memory 603 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 603 prior to their being operated upon by the one or more processor(s) 601 in the implementation of a software program. Similarly, data that a software program determines should be sent from the computing system to an outside entity through one of the computing system interfaces, or stored into an internal storage element, is often temporarily queued in system memory 603 prior to its being transmitted or stored.

The ICH 605 is responsible for ensuring that such data is properly passed between the system memory 603 and its appropriate corresponding computing system interface (and internal storage device if the computing system is so designed). The MCH 602 is responsible for managing the various contending requests for system memory 603 access amongst the processor(s) 601, interfaces and internal storage elements that may proximately arise in time with respect to one another.

One or more I/O devices 608 are also implemented in a typical computing system. I/O devices generally are responsible for transferring data to and/or from the computing system (e.g., a networking adapter); or, for large scale nonvolatile storage within the computing system (e.g., hard disk drive or semiconductor non volatile storage device that is the main store for the system's program code when the system is powered off). ICH 605 has bi-directional point-to-point links between itself and the observed I/O devices 608.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
reading a cache tag and said cache tag's corresponding ECC from storage circuitry of a cache;
generating an ECC for a search tag;
calculating a hamming distance between a) and b) below:
a) said cache tag and its corresponding ECC;
b) said search tag and its corresponding ECC; and
determining if said cache tag matches said search tag by determining if said hamming distance is two or less.

2. The method of claim 1 wherein said reading and said generating are performed concurrently.

3. The method of claim 2 further comprising:
reading a second cache tag and said second cache tag's corresponding ECC from said storage circuitry concurrently with said reading of said cache tag and said cache tag's corresponding ECC from said storage circuitry; and
calculating a hamming distance between c) and d) below concurrently with said calculating of said hamming distance between a) and b) above:
c) said second cache tag and its corresponding ECC; and
d) said search tag and its corresponding ECC.

4. The method of claim 3 further comprising determining if said second cache tag matches said search tag by comparing said hamming distance between c) and d) above concurrently with said determining if said cache tag matches said search tag.

5. The method of claim 1 wherein said calculating a hamming distance further comprises:
i) performing a bitwise compare of:
m) said cache tag and its ECC; and
n) said search tag and its ECC.

6. The method of claim 5 wherein said method further comprises detecting a triple error.

7. The method of claim 5 wherein said method further comprises:
reading a second cache tag and said second cache tag's corresponding ECC from said storage circuitry concurrently with said reading of said cache tag and said cache tag's corresponding ECC from said storage circuitry;
calculating a hamming distance between c) and d) below concurrently with said calculating of said hamming distance between a) and b) above:
c) said second cache tag and its corresponding ECC;
d) said search tag and its corresponding ECC;
determining if said second cache tag matches said search tag by comparing said hamming distance between c) and d) above concurrently with said determining if said cache tag matches said search tag; and
determining which way of a plurality of ways has a sought for cached item based on which of said cache tags matches said search tag.

8. A semiconductor chip comprising cache circuitry, said cache circuitry comprising:
a) storage circuitry to store a cache tag and its corresponding ECC;
b) ECC generation circuitry to generate an ECC for a search tag;
c) bitwise comparison circuitry to perform a bitwise comparison of i) and ii) below:
i) said cache tag and its ECC;
ii) said search tag and its ECC; and
d) summation and threshold circuitry to sum over results of c) above and determine if said search tag matches said cache tag by determining if said sum is two or less.

9. The semiconductor chip of claim 8 where said bitwise comparison circuitry comprises exclusive OR logic circuitry.

10. The semiconductor chip of claim 8 where said summation and the threshold circuitry provides an indication of three or more errors.

11. The semiconductor chip of claim 8 further comprising circuitry to orchestrate a snoop into a deeper storage level coupled downstream from said threshold and compare circuitry to receive an indication whether there is a match to said search tag.

12. The semiconductor chip of claim 8 further comprising:
e) second bitwise comparison circuitry to perform a bitwise comparison of i) and ii) below:
i) another cache tag and its ECC;
ii) said search tag and its ECC; and
f) second summation and threshold circuitry to sum over results of e) above and determine if said search tag matches said another cache tag by determining if said sum is two or less.

13. The semiconductor chip of claim 12 further comprising logic circuitry to determine whether said cache tag or said another cache tag matches said search tag.

14. The semiconductor chip of claim 13 wherein said determination of whether said cache tag or said another cache tag matches said search tag is determinative as to which way sought for cached information is within.

15. A computing system comprising:
a non-volatile storage device to store the computing system's program code when the computing system is powered off;
a processor;
cache circuitry coupled to the processor, the cache circuitry including:
a) storage circuitry to store a cache tag and its corresponding ECC;
b) ECC generation circuitry to generate an ECC for a search tag;
c) bitwise comparison circuitry to perform a bitwise comparison of i) and ii) below:
i) said cache tag and its ECC;
ii) said search tag and its ECC; and
d) summation and threshold circuitry to sum over results of c) above and determine if said search tag matches said cache tag by determining if said sum is two or less.

16. The computing system of claim 15 where said bitwise comparison circuitry comprises exclusive OR logic circuitry.

17. The computing system of claim 15 where said summation and the threshold circuitry provides an indication of three or more errors.

18. The computing system of claim 15 further comprising circuitry to orchestrate a snoop into a deeper storage level coupled downstream from said threshold and compare circuitry to receive an indication whether there is a match to said search tag.

19. The computing system of claim 15 further comprising:
   e) second bitwise comparison circuitry to perform a bitwise comparison of i) and ii) below:
      i) another cache tag and its ECC;
      ii) said search tag and its ECC; and
   f) second summation and threshold circuitry to sum over results of e) above and determine if said search tag matches said another cache tag by determining if said sum is two or less.

20. The computing system of claim 19 further comprising logic circuitry to determine whether said cache tag or said another cache tag matches said search tag.

* * * * *